(12) United States Patent
Dasari et al.

(10) Patent No.: US 7,568,187 B2
(45) Date of Patent: Jul. 28, 2009

(54) SYSTEM AND METHOD FOR RUNTIME DETECTION OF PROGRAM PARAMETERS

(75) Inventors: Srinivas Dasari, Scottsdale, AZ (US); Kevin T. Harvey, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 404 days.

(21) Appl. No.: 10/905,001

(22) Filed: Dec. 9, 2004

(65) Prior Publication Data

US 2006/0130003 A1 Jun. 15, 2006

(51) Int. Cl.
*G06F 9/44* (2006.01)
(52) U.S. Cl. ...................................... 717/131
(58) Field of Classification Search .................. 717/131
See application file for complete search history.

(56) References Cited

U.S. PATENT DOCUMENTS 7,076,782 B2 * 7/2006 Smith ......................... 718/104

OTHER PUBLICATIONS

Micro Focus Object COBOL™ "Programmer's Guide to Writing Programs" by Micro Focus® Aug. 1996.*
IBM inforamtion center XL Fortran (V.8.1) User's Guide "Assembler-Level Subroutine Linkage Conventions" http://publib.ibm.com/infocenter/macxhelp/v6v81/index.jsp?topic=/com.ibm.xlf81m.doc/pgs/ug71.htm.*
Micro Focus Object COBOL TM "Programmer's Guide to Writing Programs" by Micro Focus® Aug. 1996.*
Micro Focus Object COBOL™ "Programmer's Guide to Writing Programs" by Micro Focus® Issue 3 Jun. 1998.*
Micro Focus Object COBOL TM "Programmer's Guide to Writing Programs" by Micro Focus® Issue 3 Jun. 1998.*
"Software Configuration and Library Manager (SCLM) Reference" by IBM, fourth edition (Sep. 2004).*
"Programming Tips and Techniques", by John Fife from the Bits and Bytes issue dated Jul. 1996 (2 pages).

* cited by examiner

*Primary Examiner*—Wei Y Zhen
*Assistant Examiner*—Junchun Wu
(74) *Attorney, Agent, or Firm*—Fitzpatrick, Cella, Harper & Scinto

(57) ABSTRACT

The present invention provides a computer program utility that may be employed in a COBOL programming environment to calculate the number of parameters passed from one program to another. The parameter counting utility may be called from a second program upon receiving a call with parameters from a first program. The parameter counting utility derives the number of parameters by examining the save area of a first program in relation to the save area of the second program which placed the call to the parameter counting utility. The parameter counting utility may then return the number of parameters to the calling program in the form of a variable.

6 Claims, 4 Drawing Sheets

DRIVER PROGRAM

CALLS PGM1 MULTIPLE TIMES WITH VARYING NUMBER OF PARAMETERS
100

PGM1

RECEIVES VARYING NUMBER OF PARAMETERS. CALLS UTILITY TO DETERMINE NUMBER OF PARAMETERS.
105

GETPARMC
(PARAMETER COUNT UTILITY)

RETURNS THE COUNT OF PARAMETERS PASSED
110

EXAMPLE 115

CALL "PGM1"
    USING PARM 1-PARM2-PARM3

EXAMPLE 120

CALL "GETPARMC"
    USING PARM 1-PARM2-PARM3

EXAMPLE 125

RETURNS VALUE OF "3"

NSA - New Save Area
OSA - Old Save Area

US 7,568,187 B2

SYSTEM AND METHOD FOR RUNTIME DETECTION OF PROGRAM PARAMETERS

FIELD OF INVENTION

The present invention relates generally to a computer program utility providing a parameter count to a called program, and more particularly, to a system and method for determining how many parameters in the linkage section have been passed to a called COBOL program.

BACKGROUND OF INVENTION

Since programming languages replaced punch-cards as a preferred means for providing programmatic instructions to computing devices, many languages, or derivatives thereof, have made programming more efficient and reliable. However, many organizations have discovered that the cost, effort and risk required to replace older legacy systems with modern systems is often overwhelming. Therefore, innovation has continued to support legacy systems in order to bridge gaps between the old and new computing technologies. This often includes modification of existing legacy programs and even using legacy programming languages to write new programs. COBOL is one such programming language that, in spite of newer object based programming languages, will likely remain a vital part of many organization's computing centers. However, COBOL lacks some of the flexibility that is intrinsic to the newer object based programming language, such as the ability to sequentially pass a varying number of parameters to another program and/or sub-program which has been configured to receive a defined range of parameters.

Within a COBOL program it may be possible to determine how many parameters have been passed to the program only in the first instance of the program's execution within a load module. In subsequent calls, the control blocks are not refreshed and so this process no longer works with any accuracy. For example, if a program is called the first time with 5 passed parameters, that value can be detected. If the next call only passes 3 parameters, interrogating the control blocks will typically still return a result of 5. The lack of accuracy in subsequent program calls makes it difficult to create very accommodating routines that may be passed a variable number of parameters within a load module's execution.

Typical Z/OS COBOL programming environments may comprise many main programs and sub-programs. Calling a sub-program often includes a pre-determined number of parameters to be passed by the main-program. Similarly, the program logic in the sub-program typically expects that exact number of parameters as input. Though this model may be acceptable for the vast majority of application programs, there may be instances where the number of parameters passed cannot be determined beforehand. For instance, a COBOL utility program serving different processing requirements cannot usually predetermine the number of parameters passed. Since there is no mechanism in the COBOL language to derive this number dynamically, a solution has been to replicate the sub-program many times, one for each expected combination of input parameters. However, this attempted solution often increases software cost and maintenance.

Another solution to this problem has been to call a utility program through a driver program written in assembler. Assembler, being a lower level language, has access to all the operating system registers which can be used to compute this number. The Assembler program in turn appends the count as an additional parameter and calls the actual sub-program. Though this method may be acceptable, it often required an unnecessary call to an artificial driver. Another alternative method was to modify the main program and pass the number of parameters as an additional parameter to the subprogram. However, this method usually involves hard coding this number in the main program and maintaining this number every time the call parameter is changed. Any out of sync errors between the count and the actual parameters passed can trigger serious system abends. Either alternative is very expensive when one upgrades one of the called modules in an existing application to accept a variable number of parameters without changing all the calling modules.

Other attempts were also made where the addresses of the input parameters were checked for null. However, in reusable programming, this sometimes turns out to be erroneous as the addresses are not initialized for every call. Therefore, a need exists for a system and method for run-time detection of input parameter counts in a Z/OS COBOL environment.

SUMMARY OF INVENTION

The present invention addresses the parameter counting limitations of the COBOL programming language and eliminates or minimizes the need for an artificial driver between a main COBOL program and a sub-program. If the main and sub programs follow the standard COBOL linkage conventions, the sub-program can call the parameter count utility program (GETPARMC) of the present invention. GETPARMC returns the number of parameters passed by tracing the system registers backwards and locating the parameters list. The invention requires little or no change to the main COBOL program and does not require an intermediate driver.

BRIEF DESCRIPTION OF DRAWINGS

A more complete understanding of the present invention may be derived by referring to the detailed description and claims when considered in connection with the Figures, wherein like reference numbers refer to similar elements throughout the Figures, and:

DETAILED DESCRIPTION

Figure 1:
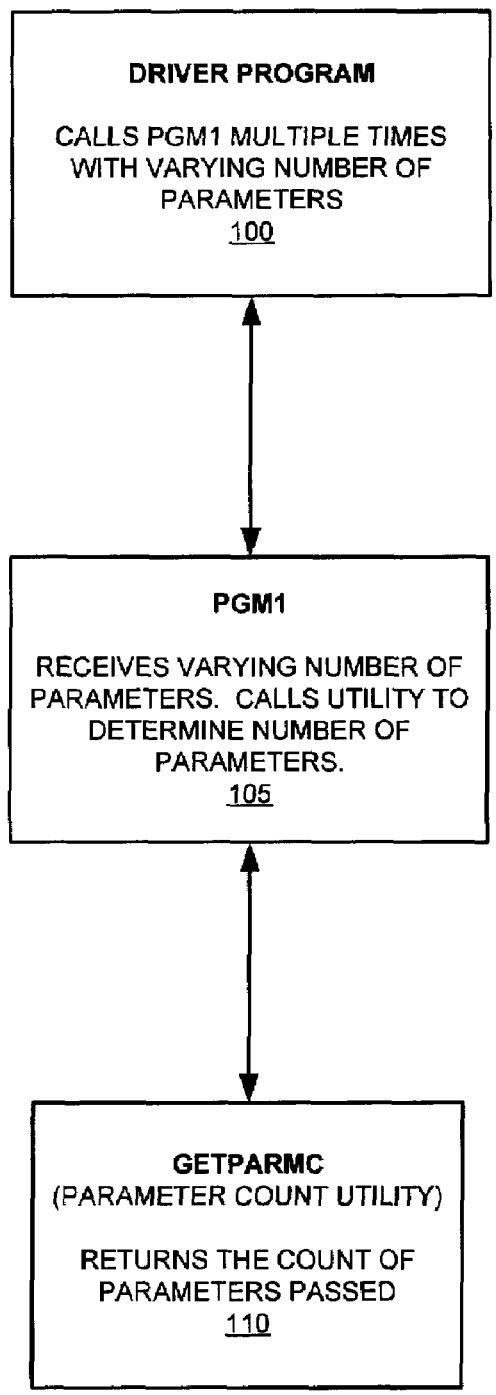
FIG. 1 is a block diagram illustrating a high-level view of an exemplary calling sequence between the system components.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it may be understood that other embodiments may be realized and that logical and mechanical changes may be made without departing from the spirit and scope of the invention. Thus, the detailed description herein is presented for purposes of illustration only and not of limitation.

While the invention described herein may specifically refer to the operating environment as Z/OS, this invention may be equally applicable to other operating systems supporting COBOL and following similar linkage conventions such as, for example, OS/390 MVS. For the sake of clarity, the description refers herein to Z/OS, therefore in an exemplary embodiment, the invention may be employed within Z/OS or any other operating system where both the main and sub-programs follow standard COBOL linkage conventions. Because the basic algorithm of the utility program of the invention requires access to operating system registers, the utility program may be deployed through Assembler. Assembler is a program that translates assembly language programs into machine language so that a computer can execute the instructions. To better understand the algorithm of the invention, several Assembler terms and COBOL standard linkage conventions are explained below.

System Registers are special purpose areas in a computer which store data and/or addresses. Specifically, registers are located in a central processing unit (CPU) of a computing system. Though there are different types of registers, for simplicity, only general purpose registers will be discussed herein. The number of general purpose registers contained within a computing system may vary, however there are 16 general purpose registers in IBM Z-series mainframes. These registers are numbered from 0 through 15 and are also known as R0, R1, R2 . . . . through R15.

A Save Area is an area assigned in computer memory which is used by a program and which stores a calling program's registers. An assigned save area may avoid destroying the registers by the called program. When the called program exits, the registers are restored to their original content by using this save area. In addition to registers, the save area may also store pointers which point to previous and next save areas in the calling chain.

Each program may provide a standard save area where registers are saved by the called program. Before a called program is terminated, it may retrieve the registers from the save area and restore the original registers. The address of the save area may be provided in register R13 before calling the sub-program. The address of the input parameters is to be stored in 'parmlist' and the address of the 'parmlist' is supplied in register R1. The first bit of the last parameter address may be set to '1' to indicate the end of parameters.

FIG. 1 is a block diagram illustrating a high-level view of the calling sequence in an exemplary embodiment of the invention. Driver program 100 may comprise any program that executes calls to other programs and/or sub-programs. A driver program, for example, may be a program that processes banking data from backend mainframe systems and transmits the data to an Internet server which in turn transmits the data to a customer engaging in online banking. A driver program 100 may call one or more other programs and/or subprograms to perform specialized functions. Using the previous example, a driver program 100 may call a first sub-program called "GETCUSTOMERDATA", a second sub-program called "GETACCOUNTDATA" and a third sub-program called "MERGEDATA".

Each time a driver program 100 makes a call to a program and/or sub-program, it may pass parameters. Parameters may be used by a sub-program in order to understand how it is to execute a call. Continuing with the online banking example, the GETACCOUNTDATA sub-program may be called in order to retrieve account data regarding a customer from a backend mainframe. In order to do this, the sub-program may use an account identifier in order to understand what account data needs to be retrieved. The account identifier may be provided to the sub-program as a parameter. A sub-program may be configured to accept any number of parameters and even varying number of parameters. However, the sub-program may be aware of how many parameters are being passed in order to process each properly. While this is not a problem in modern programming languages, the ability to know the number of parameters contained within a call following a first call is not an inherent feature within COBOL.

Driver program 100 may make multiple calls to the PGM1 105 and each call may contain varying numbers of parameters. It is apparent from the example 115 that driver program 100 is making a call to sub-program, PGM1 and is passing three parameters, PARM1, PARM2 and PARM3. When the call containing the parameters is received by PGM1, it may call the parameter count utility, GETPARMC 110 of the invention in order to determine the number of parameters it has received from the call. Example 120 illustrates the sub-program PGM1 105 calling procedure GETPARMC 110 and passing the original set of parameters, PARM1, PARM2 and PARM3.

When PGM1 105 calls the utility, GETPARMC 110, it may calculate the number of parameters within the call by tracing the system registers backwards and locating the parameter list of the driver program 100. The utility then returns the count (which would be "3" in this example 125) to PGM1 105 within a variable. Understanding how many parameters accompanied the call from the driver program 100, PGM1 105 may now properly process the call from Program A 200. The means by which the utility 110 derives the number of parameters will be discussed in greater detail herein.

As will be appreciated by one of ordinary skill in the art, the present invention may be embodied as a customization of an existing system, an add-on product, upgraded software, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The various system components discussed herein may include one or more of the following: a server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user data, debt data, income data, provider data; financial institution data; and/or like data useful in the operation of the present invention. As those skilled in the art will appreciate, the utility of the present invention may be developed on a programmer computer which may include an operating system as well as various conventional support software and drivers typically associated with computers. Programmer computer can be in a home or business environment with access to a network.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998), the contents of which are hereby incorporated by reference.

The present invention may be described herein in terms of functional block components, screen shots, optional selections and various processing steps. It may be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming language following the linkage conventions as described herein with the various algorithms being implemented with any combination of data structures, objects, processes, routines or other programming elements. Further, it may be noted that the present invention may employ any number of conventional techniques for data transmission, signaling, data processing, network control, and the like.

Each programmer may be equipped with a computing device in order to interact with the system to create calls to the parameter counting utility. Each programmer may each have a computing unit in the form of a personal computer, although other types of computing units may be used including laptops, notebooks, hand held computers, set-top boxes, cellular telephones, touch-tone telephones and the like. A programmer may have a computing unit implemented in the form of a computer-server, although other implementations are contemplated by the invention. The parameter counting utility may be implemented in a computing center shown as a server. However, The parameter counting utility may be implemented in other forms, such as a mini-computer, a PC server, a network of computers located in the same of different geographic locations, or the like. Moreover, the system contemplates the use, sale or distribution of any services or information over any network having similar functionality described herein These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Figure 2:
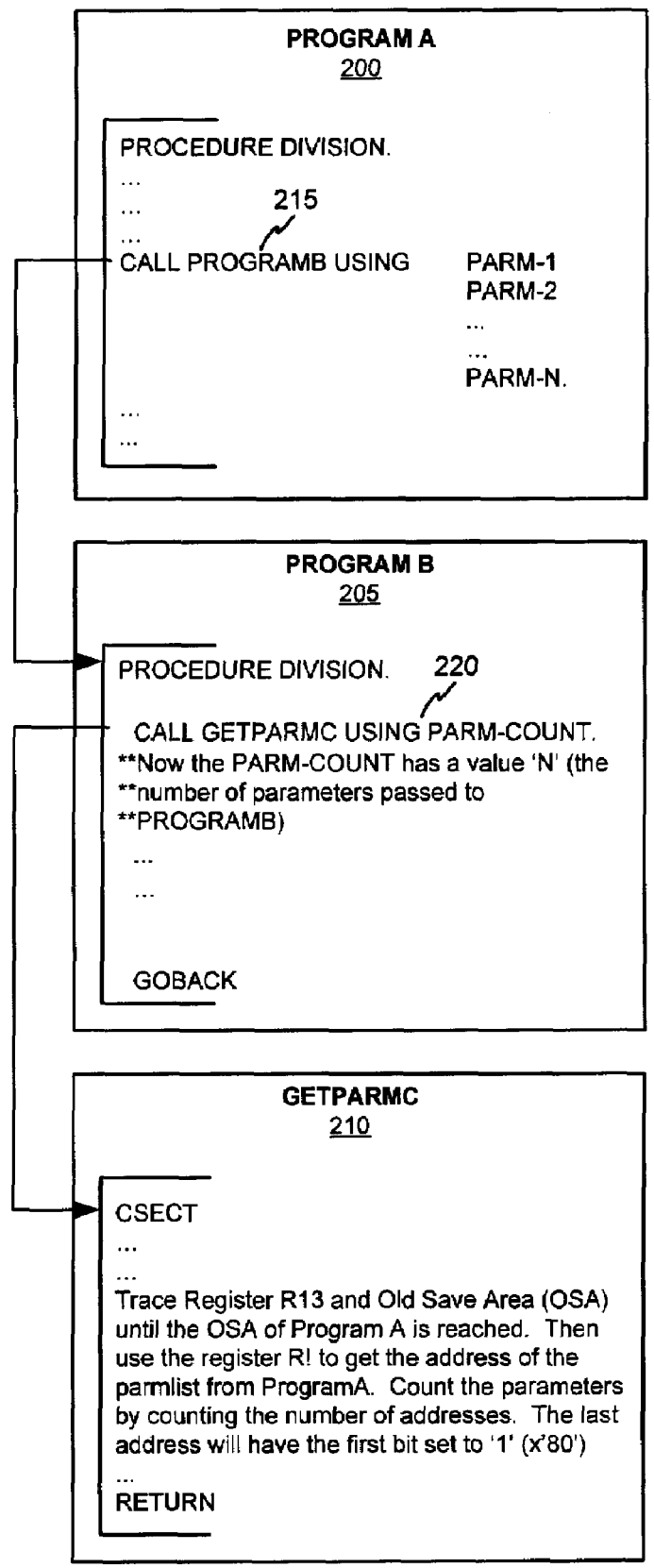
FIG. 2 is a block diagram illustrating greater detail of an exemplary calling sequence.

FIG. 2 is a block diagram illustrating greater detail of the calling sequence in a typical implementation of the invention. A parameter count algorithm may best be explained by stepping through a call chain of the main and sub-programs. Frequent reference will be made to FIGS. 3 and 4 in the discussion of FIG. 2 in order to explain the means employed by the present invention to derive a number a parameters in a call.

Figure 3:
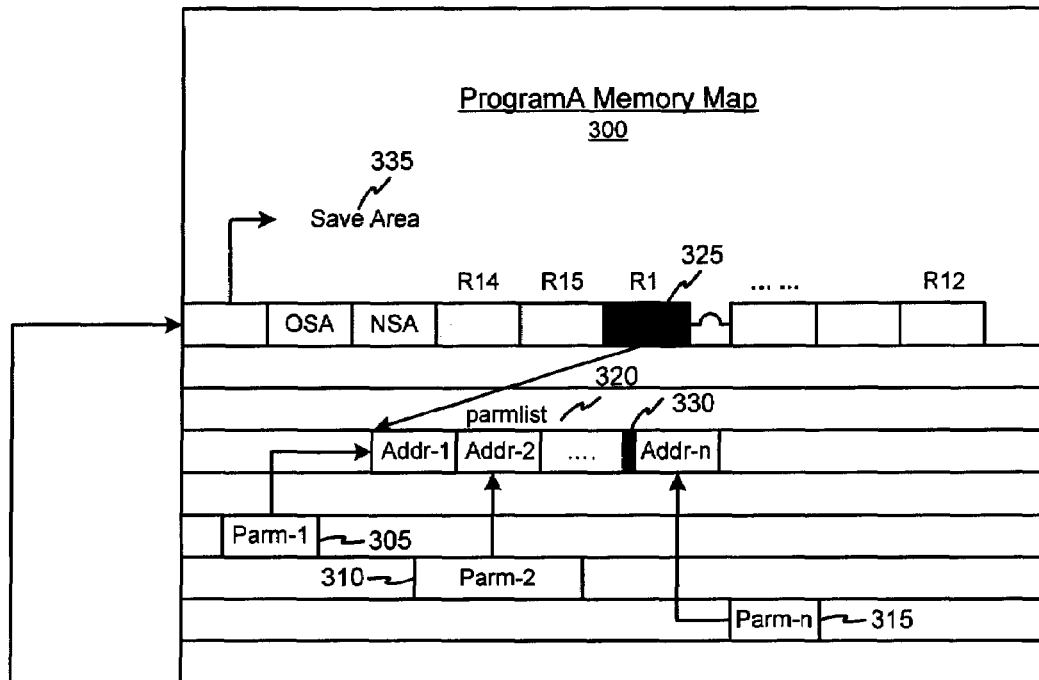
FIG. 3 is a diagram illustrating an exemplary flow of data within a computer's memory as it relates to a main program.

In one embodiment, ProgramA 200 may call a sub-program 205 in order to perform a specific function such as, for example, performing calculations, extracting data from legacy systems, sorting data and the like. In order to provide a sub-program 205 with the data and/or instructions it may need to perform its function, ProgramA 200 may attach parameters to the call function 215. Referring now to FIG. 3, ProgramA memory map shows the state of memory for ProgramA 200 at the time of a call to ProgramB 205, Parm-1 305, Parm-2 310 and Parm-n 315 are the parameters passed to ProgramB 205. The address of each of the parameters is strung together in ProgramA's memory as a parameter list 320. The address of the parameter list 320 is passed in register R1 325 before calling ProgramB 205. The first bit of the last address 330 is overwritten with bit '1'. The memory area shows the save area 335 of ProgramA 200 prior to the call to ProgramB 205.

Figure 4:
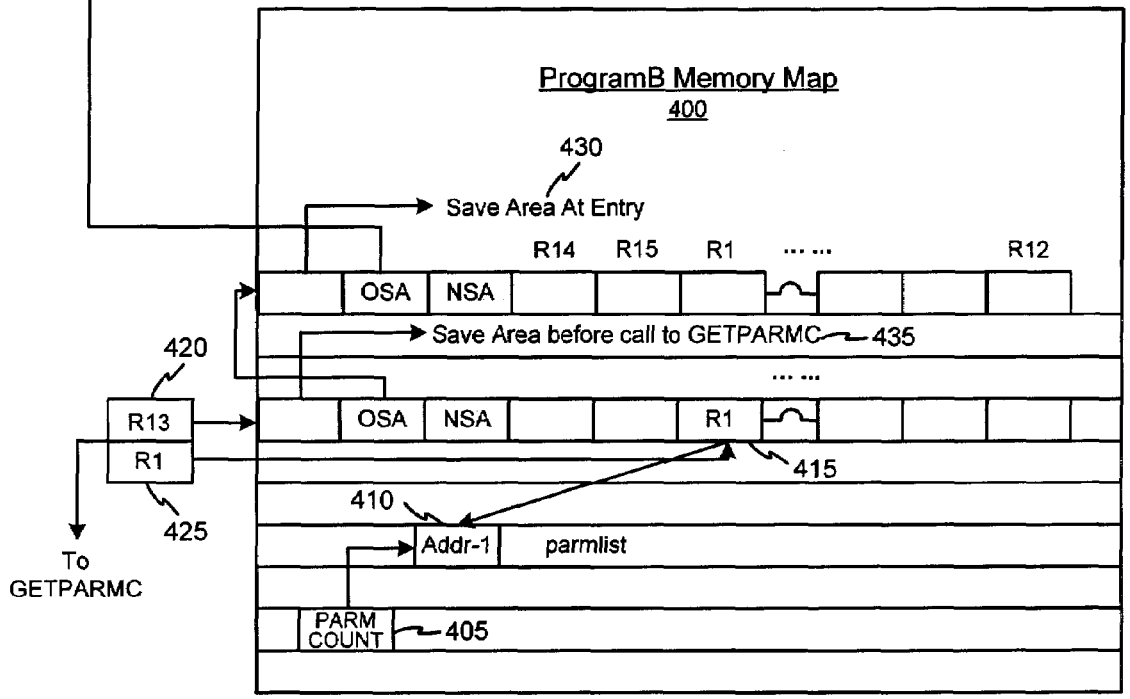
FIG. 4 is a diagram illustrating an exemplary flow of data within a computer's memory as it relates to a sub-program; and, FIG. 5 is a diagram illustrating an exemplary memory map as it relates to an exemplary parameter counting utility.

FIG. 4 depicts an exemplary memory map of ProgramB 400 at the time of the call to GETPARMC 220. As illustrated in FIG. 2, ProgramB 205 executes a call 220 to the GETPARMC module 210 in order to calculate the number of parameters passed to it by ProgramA 200. The PARM COUNT field 405 in the memory contains the address 410 of this parameter. ProgramB 205 populates register R1 415 with the address of the parmlist 410 and register R13 420 with the address of save area 435. The two save areas in ProgramB 205 depict the save area used to preserve the registers at the time of entry 430 and at the time of a call to the GETPARMC utility 435.

In an exemplary embodiment, the system includes a method for determining the number of parameters in a linkage section in a call that has been passed to a called program from a calling program. The assembler program examines the calling program save area until the first save area is found. For example, the assembler program may traverse a memory structure, starting with the last save area and traversing the memory using previous SAVEAREA pointer until the first save area which is two levels above is found. The assembler program then locates, in the save area, the original parameter list address from a register. The assembler program then checks each address in the parameter list until a last address is found. The assembler program then counts the number of addresses in the parameter list to obtain a total number of addresses and transmits the total number of addresses back to a calling program as a variable.

Figure 5:
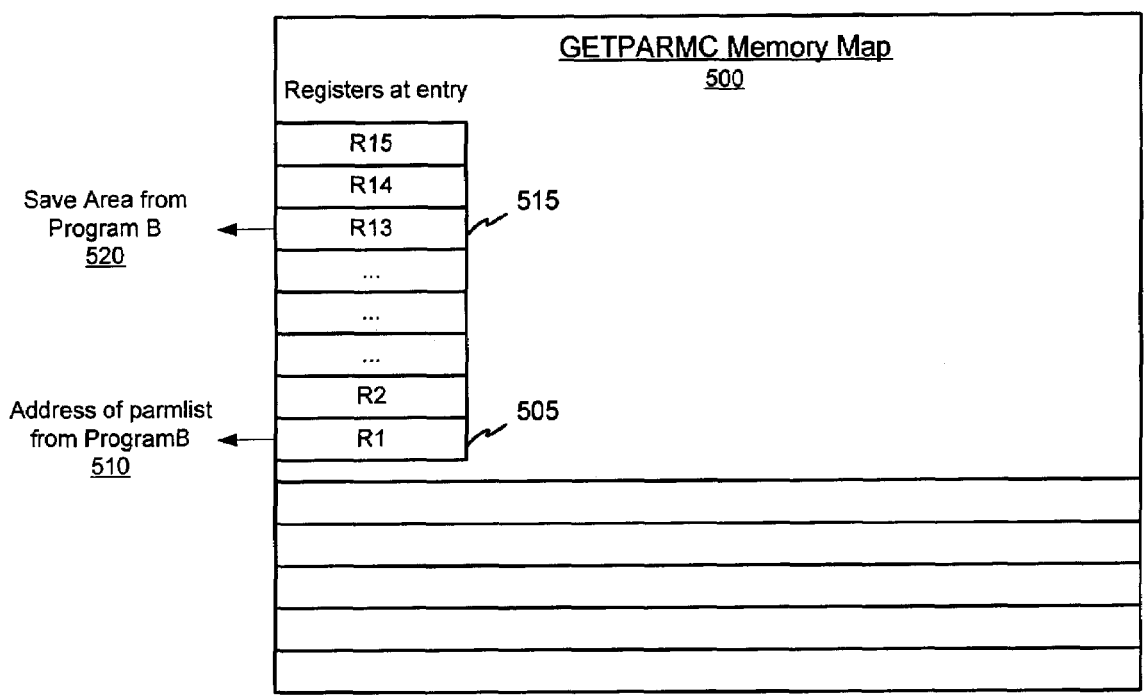

FIG. 5 is a diagram illustrating an exemplary memory map as it relates to the parameter count utility of the invention. Further, FIG. 5 depicts exemplary system registers at the time of entry to the GETPARMC utility 500. Register R1 505 points to the address of the parmlist in ProgramB 510. Register R13 515 points to the address of save area in ProgramB 520. According to standard linkage conventions, the registers are protected by storing the registers R14 through R12 in the save area provided by the caller. The second field in the save area is 4 bytes long and stores the previous save area (PSA). Using this field, the algorithm is able to trace the call chain and the corresponding registers.

It may be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention may be determined by the appended claims and their legal equivalents, rather than by the examples given above.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A method for determining a number of parameters in a linkage section in a call that has been passed to a called program from a calling program, said method comprising:
    examining a calling program save area until a first save area is found;
    locating, in said save area, a parameter list from a register, the parameter list including at least one address;
    identifying a first address in the parameter list;
    searching a first bit of each address in the parameter list until the first bit equals one, wherein the address with the first bit set to one is the last address;
    counting a number of addresses in the parameter list from the first address to the last address to obtain a total number of addresses; and
    transmitting the total number of addresses back to the called program as a variable.

2. The method of claim 1, wherein the called program includes a COBOL program.

3. The method of claim 1, wherein the method is executed by an assembler program.

4. The method of claim 1, wherein the first save area includes a plurality of registers.

5. The method of claim 1, wherein the examining of the calling program includes finding the first save area by traversing the calling program save area until the first save area is found.

6. The method of claim 1, wherein the parameter list includes at least one address corresponding to a parameter.

* * * * *

UNITED STATES PATENT AND TRADEMARK OFFICE
CERTIFICATE OF CORRECTION

| | |
|---|---|
| PATENT NO. | : 7,568,187 B2 |
| APPLICATION NO. | : 10/905001 |
| DATED | : July 28, 2009 |
| INVENTOR(S) | : Srinivas Dasari et al. |

It is certified that error appears in the above-identified patent and that said Letters Patent is hereby corrected as shown below:

<u>TITLE PAGE COL. 2 [56] REFERENCES CITED</u>

Other Publications
"inforamtion" should read --information--; and "http://publib.ibm.com/" should read --http://publib.boulder.ibm.com/--.

Signed and Sealed this

Third Day of November, 2009

David J. Kappos
*Director of the United States Patent and Trademark Office*